(12) United States Patent
Kim

(10) Patent No.: US 12,425,534 B2
(45) Date of Patent: Sep. 23, 2025

(54) VIDEO MANAGEMENT SYSTEM AND VIDEO MANAGEMENT METHOD

(71) Applicant: HANWHA TECHWIN CO., LTD., Seongnam-si (KR)

(72) Inventor: Han Sang Kim, Seongnam-si (KR)

(73) Assignee: Hanwha Vision Co., Ltd., Seongnam-si (KR)

( * ) Notice: Subject to any disclaimer, the term of this patent is extended or adjusted under 35 U.S.C. 154(b) by 430 days.

(21) Appl. No.: 17/722,308

(22) Filed: Apr. 16, 2022

(65) Prior Publication Data
US 2022/0239861 A1 Jul. 28, 2022

Related U.S. Application Data

(63) Continuation-in-part of application No. 16/899,809, filed on Jun. 12, 2020, now Pat. No. 11,447,503, (Continued)

(30) Foreign Application Priority Data

Jan. 20, 2017 (KR) .......................... 10-2017-0009928

(51) Int. Cl.
*H04N 7/01* (2006.01)
*G11B 27/10* (2006.01)
(Continued)

(52) U.S. Cl.
CPC ........... *H04N 7/0117* (2013.01); *G11B 27/10* (2013.01); *H04N 5/77* (2013.01); *H04N 5/91* (2013.01);
(Continued)

(58) Field of Classification Search
CPC .......... H04N 7/0117; H04N 5/77; H04N 5/91; H04N 7/183; H04N 9/8205;
(Continued)

(56) References Cited

U.S. PATENT DOCUMENTS 9,282,291 B2 * 3/2016 Tanji .................. H04N 21/4223
2008/0117296 A1 * 5/2008 Egnal ..................... H04N 7/181
348/143

(Continued)

FOREIGN PATENT DOCUMENTS

JP 2000-059758 A 2/2000
KR 10-2015-0109978 A 10/2015

*Primary Examiner* — Girumsew Wendmagegn
(74) *Attorney, Agent, or Firm* — McLean IP Global; Jason Y. Pahng

(57) ABSTRACT

An apparatus includes: an image capturing module configured to capture an image; a converting module configured to convert a first image with a first resolution to a second image with a second resolution; a storing module configured to store the first image and the second image; a communication module configured to receive a wireless signal; and a processor configured to functionally be connected with the image capturing module, the converting module, the storing module and the communication module, wherein the processor is configured to receive, from an external device, a request signal for requesting information related to the second image; generate a metadata related to the second image by analyzing the second image; and transmit, to the external device, an additional information about the second image based on the metadata.

19 Claims, 12 Drawing Sheets

Related U.S. Application Data which is a continuation of application No. 15/795,599, filed on Oct. 27, 2017, now Pat. No. 10,708,540.

(51) Int. Cl.

| | | |
|---|---|---|
| *H04N 5/77* | (2006.01) | |
| *H04N 5/91* | (2006.01) | |
| *H04N 7/18* | (2006.01) | |
| *H04N 9/82* | (2006.01) | |
| *H04N 21/2343* | (2011.01) | |
| *H04N 21/235* | (2011.01) | |
| *H04N 21/2743* | (2011.01) | |
| *H04N 21/4223* | (2011.01) | |
| *H04N 21/84* | (2011.01) | |

(52) U.S. Cl.
CPC ........... *H04N 7/183* (2013.01); *H04N 9/8205* (2013.01); *H04N 21/234363* (2013.01); *H04N 21/23439* (2013.01); *H04N 21/2353* (2013.01); *H04N 21/2743* (2013.01); *H04N 21/4223* (2013.01); *H04N 21/84* (2013.01)

(58) Field of Classification Search
CPC ..... H04N 21/234363; H04N 21/23439; H04N 21/2353; H04N 21/2743; H04N 21/4223; H04N 21/84; H04N 21/23418; G11B 27/10; G11B 27/102; G11B 27/28

See application file for complete search history.

(56) References Cited

U.S. PATENT DOCUMENTS

| | | | |
|---|---|---|---|
| 2017/0236029 A1* | 8/2017 | Howell | G06V 20/00 382/159 |
| 2019/0051127 A1* | 2/2019 | Kanga | G08B 13/19658 |

* cited by examiner

10

VIDEO MANAGEMENT SYSTEM AND VIDEO MANAGEMENT METHOD

CROSS-REFERENCE TO THE RELATED APPLICATION

This is a continuation-in-part application of U.S. application Ser. No. 16/889,809 filed on Jun. 2, 2020. U.S. application Ser. No. 16/889,809 is a continuation application of U.S. application Ser. No. 15/795,599, filed on Oct. 27, 2017. In addition, this application claims priority from Korean Patent Application No. 10-2017-0009928, filed on Jan. 20, 2017, in the Korean Intellectual Property Office, the disclosure of which is incorporated herein in its entirety by reference.

BACKGROUND

1. Field

Exemplary embodiments relate to a video management system and a video management method.

2. Description of the Related Art

Video management systems for imaging a surveillance area and storing/analyzing an obtained image are used for information acquisition or surveillance. Such video management systems may capture an image, store the image, analyze the image, and provide information about the image requested by a user. To this end, video management systems may include an imaging device for capturing an image and a video management server for storing and analyzing the captured image.

Recently, an imaging device capable of obtaining a high-resolution image has been generally used in a video management system. However, as a resolution of an image handled by the video management system has increased, the amount of data to be stored and/or processed has increased, thereby causing issues such as increase in cost and less efficient transmission of image data.

If a video management server performs image analysis, a high-resolution image captured by an imaging device needs to be transmitted to the video management server. In this case, the amount of data needed to transmit the high-resolution image rapidly increases, thereby significantly increasing an inbound cost of the video management server.

If an imaging device performs image analysis, the cost of the imaging device may increase because complex intelligent image analysis may need to be performed.

SUMMARY

Exemplary embodiments include a video management system and a video management method that may allow an imaging device to capture a high-resolution image, and simultaneously store the high-resolution image and transmit a low-resolution image, converted from the high-resolution image, to a video management server.

Exemplary embodiments include a video management system and a video management method that may allow a video management server to analyze a low-resolution image, provide the low-resolution image and an analysis result according to a request of an external user, and when receiving a request to provide information related to a high-resolution image from the external user, provide the information through an imaging device. Additional aspects will be set forth in part in the description which follows and, in part, will be apparent from the description, or may be learned by practice of the exemplary embodiments.

According to an exemplary embodiment, there is provided a video apparatus comprising: an image capturing module configured to capture an image; a converting module configured to convert a first image with a first resolution to a second image with a second resolution; a storing module configured to store the first image and the second image; a communication module configured to receive a wireless signal; and a processor configured to functionally be connected with the image capturing module, the converting module, the storing module and the communication module, the processor being configured to: receive, from an external device, a request signal for requesting information related to the second image; generate a metadata related to the second image by analyzing the second image; and transmit, to the external device, an additional information about the second image based on the metadata.

The processor may be further configured to transmit, to the external device, at least a portion of a metadata related to the first image.

The at least a portion of the metadata related to the first image is transmitted when the communication module receives, from the external device, a request signal for requesting information related to the first image.

The processor may be further configured to generate the metadata related to the first image by analyzing the first image.

The processor may be further configured to store the metadata related to the first image.

The processor may be further configured to analyze the second image based on a machine learning technique.

A specific image of the image captured by the image capturing module may not be converted.

The specific image may be a best shot image.

The second resolution may have a lower resolution than the first resolution.

The second image may have a smaller bandwidth than the first image.

According to another exemplary embodiment, there is provided a server device comprising: a converting module configured to convert a first image with a first resolution to a second image with a second resolution; a storing module configured to store the first image and the second image; a communication module configured to transceive a wireless signal; and a processor configured to functionally be connected with the converting module, the storing module and the communication module, the processor being configured to: receive, from an imaging device, the first image captured by the imaging device; receive, from an external device, a request signal for requesting information related to the second image; generate a metadata related to the second image by analyzing the second image; and transmit, to the external device, an additional information about the second image based on the metadata.

The processor may be further configured to transmit, to the external device, at least a portion of a metadata related to the first image.

The at least a portion of the metadata related to the first image may be transmitted when the communication module receives, from the external device, a request signal for requesting information related to the first image.

The processor may be further configured to generate the metadata related to the first image by analyzing the first image.

The processor may be further configured to store the metadata related to the first image.

The processor may be further configured to analyze the second image based on a machine learning technique.

A specific image of the image captured by the image capturing module may not be converted.

The specific image may be a best shot image.

The second resolution may have a lower resolution than the first resolution.

The second image may have a smaller bandwidth than the first image.

BRIEF DESCRIPTION OF THE DRAWINGS

The above and/or other aspects will become apparent and more readily appreciated from the following description of the exemplary embodiments, taken in conjunction with the accompanying drawings in which.

DETAILED DESCRIPTION OF THE EXEMPLARY EMBODIMENTS

Figure 1:
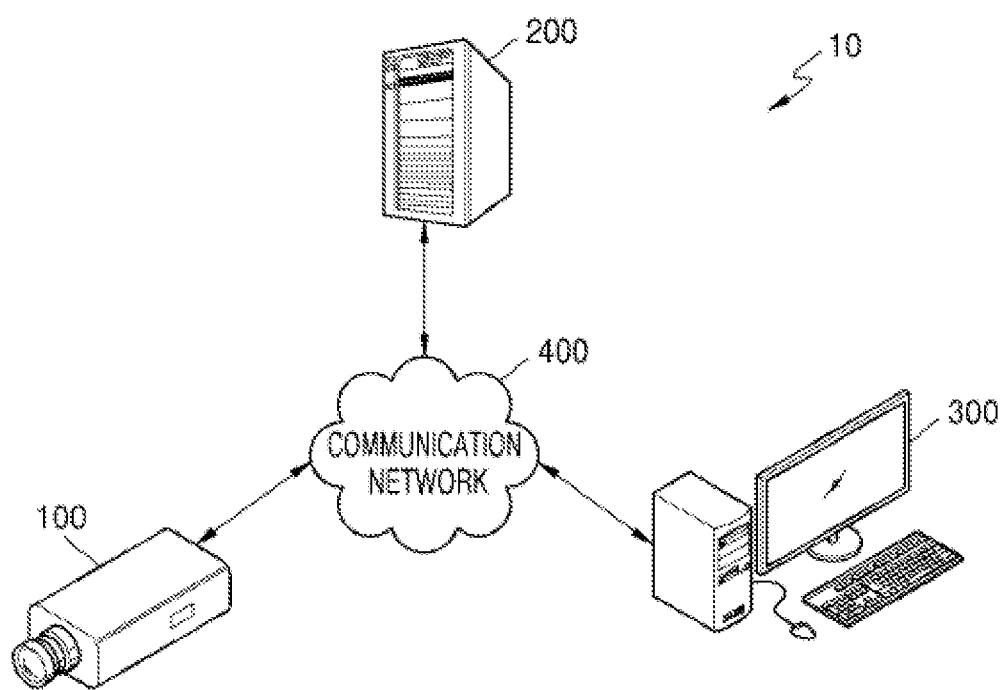
FIG. 1 is illustrates a configuration of a video management system according to an exemplary embodiment.

Hereinafter, exemplary embodiments will be described in detail with reference to the accompanying drawings. These exemplary embodiments are described in sufficient detail to enable those skilled in the art to practice the inventive concept, and it is to be understood that the exemplary embodiments are not intended to limit the present disclosure to particular modes of practice, and it is to be appreciated that all modification, equivalents, and alternatives that do not depart from the spirit and technical scope of the present disclosure are encompassed in the present disclosure.

The terms used herein are used for the purpose of describing the exemplary embodiments, and not for the purpose of limiting and/or restricting the present disclosure.

It will be understood that although the terms "first", "second", etc. may be used herein to describe various elements, these elements should not be limited by these terms. These elements are only used to distinguish one element from another. As used herein, the singular forms "a", "an", and "the" are intended to include both the singular and plural forms, unless the context clearly indicates otherwise. It will be further understood that the terms "comprises" and/or "comprising" used herein specify the presence of stated features or components, but do not preclude the presence or addition of one or more other features or components. Sizes of elements may be exaggerated for convenience of explanation. In other words, since sizes and thicknesses of elements in the drawings are arbitrarily illustrated for convenience of explanation, the following embodiments are not limited thereto.

The recitation of ranges of values herein are merely intended to serve as a shorthand method of referring individually to each separate value falling within the ranges, unless otherwise indicated herein, and each separate value is incorporated into the specification as if it were individually recited herein.

Also, the operations of all methods described herein may be performed in any suitable order unless otherwise indicated herein or otherwise clearly contradicted by context. The present disclosure is not limited to the described order of the operations. The use of any and all examples, or exemplary language (e.g., "such as") provided herein, is intended merely to better explain the present disclosure and does not pose a limitation on the scope of the present disclosure unless otherwise claimed.

Hereinafter, the present disclosure will be described in detail by explaining exemplary embodiments with reference to the accompanying drawings. Like elements in the drawings are denoted by like reference numerals, and thus a repeated explanation thereof will not be given.

FIG. 1 illustrates a configuration of a video management system 10 according to an exemplary embodiment.

Referring to FIG. 1, the video management system 10 according to an exemplary embodiment may include an imaging device 100 and a video management server 200.

The imaging device 100 may be an electronic imaging device located at a fixed position of a specific location, an electronic imaging device that may automatically or manually move along a predetermined path, or an electronic imaging device that may be moved by a person, a robot, or the like. The imaging device 100 may be an Internet protocol (IP) camera that is used by being connected to the Internet by wire/wirelessly. The imaging device 100 may be a pan-tilt-zoom (PTZ) camera that may pan, tilt, and zoom. The imaging device 100 may record a surveillance area or capture an image of the surveillance area. The imaging device 100 may record a sound produced in the surveillance area. When a change such as a movement or a sound occurs in the surveillance area, the imaging device 100 may generate a notification, may record the change, and/or may capture an image.

The video management server 200 may be configured to receive and store an image captured by the imaging device 100 and/or an image obtained by editing the image captured by the imaging device 100. The video management server 200 may generate metadata and index information about the metadata by analyzing the received image. The video management server 200 may generate the metadata and the index information about the metadata by analyzing image information and/or sound information included in the received image together or separately.

The video management system 10 may further include an external device 300 that may perform wired/wireless communication with the imaging device 100 and/or the video management server 200.

The external device 300 may transmit an information request signal requesting the video management server 200 to provide an entire image or a part of an image captured by the imaging device 100. The external device 300 may transmit an information request signal requesting the video management server 200 to provide metadata and/or index information about the metadata obtained by analyzing the image transmitted from the video management server 200.

The video management system 10 may further include a communication network 400 that is a wired/wireless communication path between the imaging device 100, the video management server 200, and/or the external device 300. The communication network 400 may be, but is not limited to, a wired network such as a local area network (LAN), a wide area network (WAN), a metropolitan area network (MAN), or an integrated service digital network (ISDN) or a wireless network such as a wireless LAN, code-division multiple access (CDMA), Bluetooth, or satellite communication.

Figure 2:
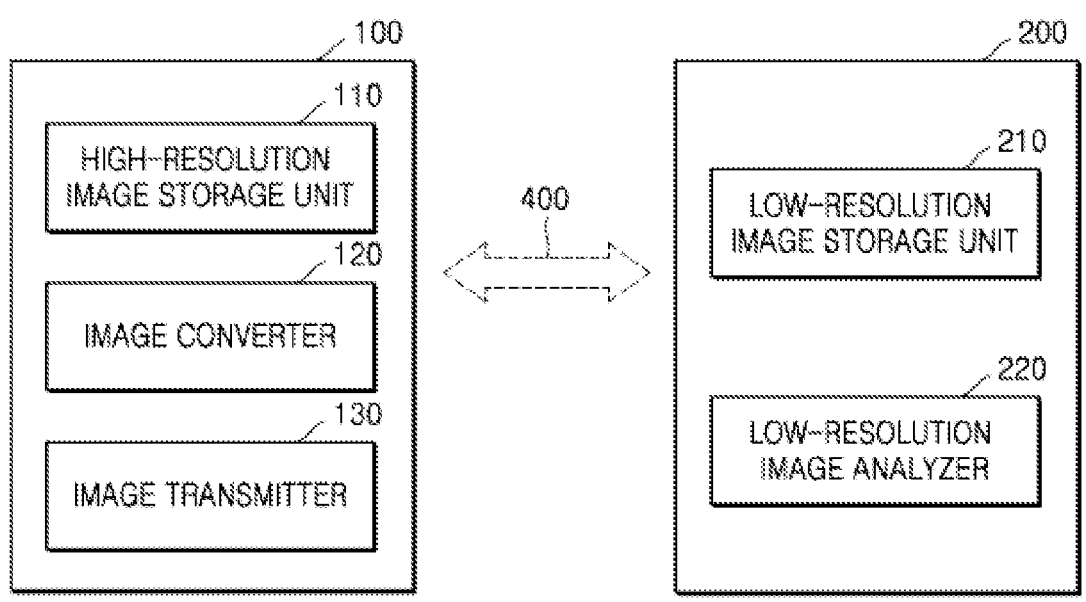
FIG. 2 is a block diagram illustrating a configuration of the video management system according to an exemplary embodiment.

FIG. 2 is a block diagram illustrating a configuration of the video management system 10 according to an exemplary embodiment.

Referring to FIG. 2, the video management system 10 according to an exemplary embodiment may include the imaging device 100 and the video management server 200. In this case, the imaging device 100 may include a high-resolution image storage unit 110, an image converter 120, and an image transmitter 130. The video management server 200 may include a low-resolution image storage unit 210 and a low-resolution image analyzer 220.

The imaging device 100 may generate a first image by capturing a surveillance area at a first resolution. Surveillance area may include an area to be monitored by the video management system 10 or an area where information is to be obtained. The surveillance area may be an area around the imaging device 100 including a position where the imaging device 100 is installed, or an area not including the position where the imaging device 100 is installed.

In this case, the first resolution may be a high-resolution. For example, the first resolution may be a high definition (HD) resolution, a full HD (FHD) resolution, or a 4K resolution. Exemplary embodiments are not limited thereto, and the first resolution may be any of various resolutions that are higher than a second resolution described below.

The high-resolution image storage unit 110 may store the first image captured at the first resolution. Examples of the high-resolution image storage unit 110 may include, but are not limited to, a hard disk drive or a solid-state drive, and any of various magnetic storage media or flash storage media.

According to an exemplary embodiment, the image converter 120 may convert the first image into a second image having a second resolution that is lower than the first resolution. For example, when the first resolution is a 4K resolution, the second resolution may be a 640×480 resolution.

In this case, the video management system 10 may determine the second resolution based on channels that may be used to upload an image from the imaging device 100 to the video management server 200. For example, in order for the imaging device 100 to transmit an HD screen output to the video management server 200 in real time, a data rate of the video management server 200 may need to be equal to or greater than 2 Mbps. If a plurality of the imaging devices 100 are used to transmit images to one video management server 200 or if the imaging device 100 captures a plurality of images and transmits the plurality of images to the video management server 200, a higher data rate may be required. In order for the video management server 200 to have a higher data rate, costs for constructing the video management server 200 may be increased. Accordingly, the video management system 10 may determine a size of an image that the video management server 200 may receive without difficulty, considering the data rate of the video management server 200. The image converter 120 may determine a resolution corresponding to the determined size of the image as the second resolution.

The image transmitter 130 may transmit the second image to the video management server 200. The image transmitter 130 may transmit the second image to the video management server 200 at a time that is almost the same as the time when the imaging device 100 captures the first image. The image transmitter 130 may also transmit the second image to the video management server 200 with a time difference from the time when the imaging device 100 captures the first image.

The imaging device 100 may perform in parallel an operation of storing the first image and an operation of converting the first image into the second image and transmitting the second image. In detail, the imaging device 100 may need to continuously perform an operation of obtaining and storing the first image by capturing the surveillance area during a period determined by the video management system 10. Also, the imaging device 100 may also need to continuously perform an operation of converting the first image into the second image and transmitting the second image to the video management server 200. Accordingly, the imaging device 100 may perform a first process and a second process so that the first process for storing the first image in the high-resolution image storage unit 110 and the second process for converting the first image into the second image by the image converter 120 and transmitting the second image to the video management server 200 by the image transmitter 130 at least partially overlap each other.

The video management server 200 may receive the second image transmitted from the imaging device 100. The low-resolution image storage unit 210 may store the second image. Examples of the low-resolution image storage unit 210 may include, but are not limited to, a hard disk drive or a solid-state drive, and any of various magnetic storage media or flash storage media.

The low-resolution image analyzer 220 may generate low-resolution image metadata and an index of the low-resolution image metadata by analyzing the second image. Low-resolution image metadata may include data that may provide additional information about the second image.

For example, when the low-resolution image analyzer 220 analyzes the second image and determines that a person appears in the second image 2 minutes and 30 seconds, 4 minutes, and 7 minutes and 40 seconds after the second image starts, the low-resolution image analyzer 220 may include, in the low-resolution image metadata, information indicating that scenes where the person appears exist in the above time periods.

Alternatively, when the low-resolution image analyzer 220 analyzes the second image and determines that a sound exceeding a predetermined decibel is produced 2 minutes and 40 seconds and 5 minutes after the second image starts, the low-resolution image analyzer 220 may include, in the low-resolution image metadata, information indicating that scenes where the sound exceeding the predetermined decibel is produced exist in the above time periods.

Also, the low-resolution image analyzer 220 may generate metadata related to various information that may be obtained by analyzing an image, for example, a point in time when a person appears in the image, features of the person such as clothes or gender, whether the person is registered in the video management system 10, a point in time when an object appears, a type of the object, a point in time when a sound is produced, or a type or a level of the sound, and may include the metadata in the low-resolution image metadata.

The low-resolution image analyzer 220 may analyze the second image by classifying objects in an image by using a machine learning algorithm. The low-resolution image analyzer 220 may analyze the second image, may extract various information included in the second image, and may include, in the metadata, the information or additional information (e.g., a time when each information appears, a frequency of appearance, or an average number of appearances per unit time) obtained from the information.

The low-resolution image analyzer 220 may generate an index of the low-resolution image metadata. Index may be a list or a value generated in order to easily search for a desired item in the second image or the low-resolution image metadata. That is, when the external device 300 requests the video management server 200 to provide the second image or information related to the second image, a user of the external device 300 may check an image or information at a desired point in time by referring to the low-resolution image metadata or the index of the low-resolution image metadata provided by the video management server 200.

The video management server 200 may transmit, to the imaging device 100, at least a part of the low-resolution image metadata and at least a part of the index of the low-resolution image metadata. In this case, the imaging device 100 may store the at least part of the low-resolution image metadata and the at least part of the index of the low-resolution image metadata so that the at least part of the low-resolution image metadata and the at least part of the index of the low-resolution image metadata correspond to the first image. In detail, the low-resolution image metadata may be data obtained based on the second image, and the second image may be an image obtained by converting a resolution of the first image. For example, the low-resolution image metadata may be data representing person information, object information, or sound information included in the first image. Accordingly, the imaging device 100 may process and store the at least part of the low-resolution image metadata and the at least part of the index of the low-resolution image metadata so that the at least part of the low-resolution image metadata and the at least part of the index of the low-resolution image metadata represent information about the first image.

According to an exemplary embodiment, the image converter 120 may obtain the second image by removing a sound component from the first image. In this case, the video management server 200 receiving the second image may generate image metadata and an index by analyzing the second image based on only an image component without a sound component.

According to an exemplary embodiment, the image converter 120 may obtain the second image by converting the first resolution of the first image into the second resolution that is lower than the first resolution and removing a sound component. By removing the sound component from the first image, a size of the second image may be further reduced.

Figure 3:
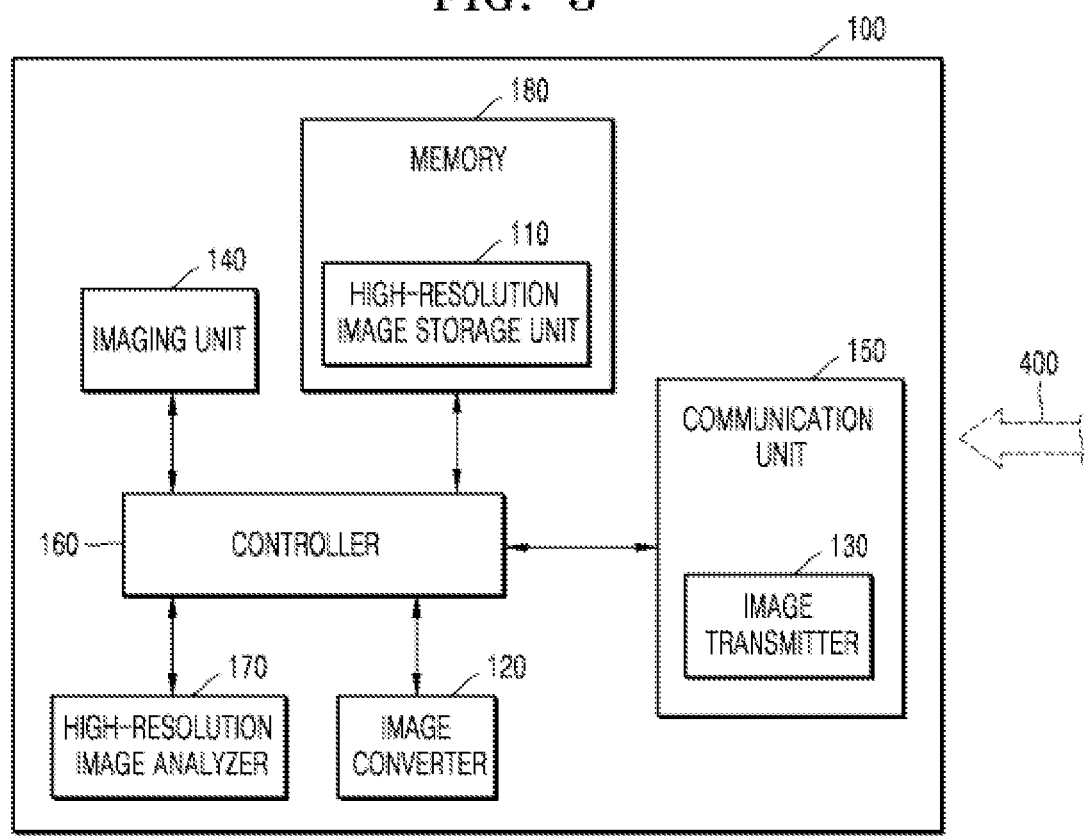
FIGS. 3 and 4 are block diagrams illustrating a configuration of an imaging device according to exemplary embodiments.
Figure 4:
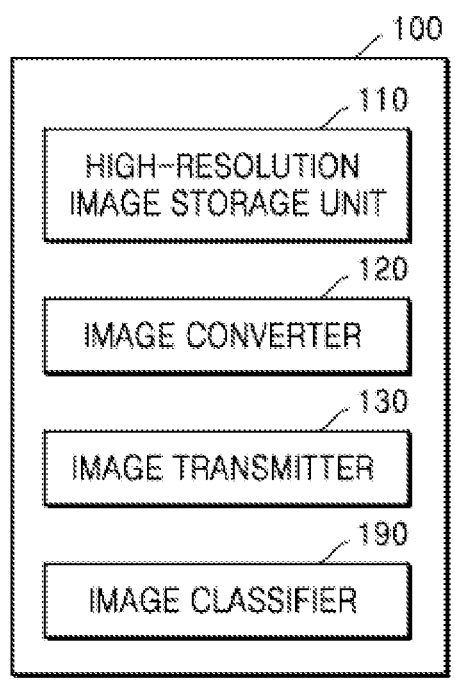

FIGS. 3 and 4 are block diagrams illustrating a configuration of the imaging device 100 according to exemplary embodiments.

Referring to FIG. 3, the imaging device 100 may further include an imaging unit 140, a communication unit 150, a controller 160, a high-resolution image analyzer 170, and/or a memory 180 in addition to the high-resolution image storage unit 110, the image converter 120, and the image transmitter 130.

The imaging device 100 may generate a first image by capturing a surveillance area at a first resolution by the imaging unit 140. The imaging unit 140 may include an optical unit and an image pickup unit.

The optical unit may include one or more lenses. The lenses may be various types of lenses. For example, the lenses may include a wide-angle lens or a fisheye lens used to monitor a wide surveillance area, a zoom lens used to enlarge and closely monitor a certain part of the entire surveillance area, and a thermal lens or an infrared (IR) lens used when an illuminance of the surveillance area is low. The lenses are not limited thereto, and may include various types of lenses for performing various functions.

The image pickup unit may form an image by converting light or thermal information received by the optical unit into an electrical image signal.

The communication unit 150 may perform wired/wireless communication with other electronic devices including the video management server 200 and/or the external device 300 or may transmit/receive an electronic signal to/from the outside by wire or wireless communication. In this case, the communication unit 150 may include the image transmitter 130. Examples of the communication unit 150 may include, but are not limited to, a Bluetooth communication unit, a Bluetooth low energy (BLE) communication unit, a near-field communication (NFC) unit, a wireless local area network (WLAN) communication unit (e.g., a Wi-Fi communication unit), a ZigBee communication unit, an infrared data association (IrDA) communication unit, a Wi-Fi Direct (WFD) communication unit, a ultra-wideband (UWB) communication unit, and an ANT+ communication unit.

The controller 160 may include a processor configured to control all operations of the imaging device 100. For example, the controller 160 may control the communication unit 150 to transmit or receive an image to/from the outside. The controller 160 may control the image converter 120 to convert the first image into a second image.

The controller 160 may include any device capable of processing data such as a processor. Processor may include, for example, a data processing device embedded in hardware and having a circuit physically structured to execute, for example, code or commands included in a program. As such, examples of the data processing device embedded in hardware may include, but are not limited to, a microprocessor, a central processing unit (CPU), a processor core, a multi-processor, an application-specific integrated circuit (ASIC), and a field programmable gate array (FPGA).

The high-resolution image analyzer 170 may generate high-resolution image metadata and an index of the high-resolution image metadata by analyzing the first image. High-resolution image metadata may include data that may provide additional information about the first image. The description of low-resolution image metadata, an index of the low-resolution image metadata, and a relationship between the low-resolution image metadata and the second image may apply to the high-resolution image metadata, the index of the high-resolution image metadata, and a relationship between the high-resolution image metadata and the image data.

When obtaining the high-resolution image metadata by analyzing the first image, the high-resolution image analyzer 170 may obtain only information that may not be obtained by analyzing the second image. For example, information about a point in time when a person or an object appears in the first image or the second image or a point in time when a sound equal to or higher than a predetermined decibel is produced may be obtained by analyzing the first image but may not be obtained by analyzing the second image. Accordingly, in order to reduce or prevent repeated analyses, the high-resolution image analyzer 170 may not perform analysis that may be performed by the low-resolution image analyzer 220. For example, a brand mark displayed on clothes of a person appearing in the first image or the second image may be clearly identified in the first image that is a high-resolution image but may not be identified or may be difficult to identify in the second image that is a low-resolution image. As a result, the brand mark may not be identified by the low-resolution image analyzer 220. The high-resolution image analyzer 170 may identify the brand mark and may include information about the brand mark in the high-resolution image metadata.

According to an exemplary embodiment, the second image may be obtained by removing a sound component from the first image. In this case, the high-resolution image analyzer 170 may obtain the high-resolution image metadata by analyzing the sound component of the first image. Also, the high-resolution image analyzer 170 may not perform image-based analysis that may be performed by the low-resolution image analyzer 220.

According to an exemplary embodiment, the second image may be obtained by reducing a resolution of the first image and removing a sound component. In this case, the high-resolution image analyzer 170 may obtain the high-resolution image metadata based on the sound component of the first image, and may obtain the high-resolution image metadata according to a result of high-resolution image-based analysis of the first image.

The memory 180 may temporarily or permanently store data processed by the imaging device 100. Examples of the memory 180 may include, but are not limited to, a hard disk drive or a solid-state drive, and any of various magnetic storage media or flash storage media.

The memory 180 may include the high-resolution image storage unit 110. The high-resolution image metadata and the index of the high-resolution image metadata obtained by analyzing the first image may be stored in the high-resolution image storage unit 110 or may be stored in the memory 180.

The imaging device 100 may transmit at least a part of the high-resolution image metadata and at least a part of the index of the high-resolution image metadata to the video management server 200 through the communication unit 150. The video management server 200 may store the at least part of the high-resolution image metadata and the at least part of the index of the high-resolution image metadata so that the at least part of the high-resolution image metadata and the at least part of the index of the high-resolution image metadata correspond to the second image. That is, since the high-resolution image metadata is data obtained from the first image and the second image is generated from the first image, although specific information indicated by the high-resolution image metadata may not be included in the second image, the video management server 200 may determine whether the specific information indicated by the high-resolution image metadata exists in the first image corresponding to a certain point in time of the second image. The video management server 200 may store the at least part of the high-resolution image metadata and the index of the high-resolution image metadata.

In this case, the low-resolution image analyzer 220 of the video management server 200 may generate low-resolution image metadata by including only data other than information included in the high-resolution image metadata, from among metadata that may be obtained by analyzing the second image. Accordingly, the video management system 10 may more efficiently use a storage space by causing the high-resolution image metadata and the low-resolution image metadata not to include redundant information. Alternatively, regardless of whether information is included in the high-resolution image metadata, the low-resolution image analyzer 220 may generate the low-resolution image metadata by including all information that may be obtained by analyzing the second image.

Also, the video management server 200 may store only low-resolution image metadata other than data included in the high-resolution image metadata from among the low-resolution image metadata. The video management system 10 may more efficiently use a storage space.

Also, the high-resolution image analyzer 170 of the imaging device 100 may generate the high-resolution image metadata by including only metadata indicating information that is included in the first image and is not included in the second image, from among metadata that may be obtained by analyzing the first image. When the external device 300 requests the video management server 200 to provide content related to information also included in the second image, the video management server 200 may directly provide the content. That is, metadata indicating information included in the second image does not need to be repeatedly analyzed by the imaging device 100. Accordingly, the imaging device 100 may more efficiently use a CPU by generating the high-resolution image metadata by including only metadata indicating information that is included in the first image and is not included in the second image and not analyzing redundant information, and may more efficiently use a storage space by not storing the redundant information.

Also, the imaging device 100 may store, in the memory 180, only high-resolution image metadata indicating information that is included in the first image and is not included in the second image from among the high-resolution image metadata. The video management system 10 may more efficiently use a storage space.

Referring to FIG. 4, the imaging device 100 may further include an image classifier 190 in addition to the high-resolution image storage unit 110, the image converter 120, and the image transmitter 130.

The image classifier 190 may analyze a first image and may classify the first image into a transmission-required image needed to be transmitted to the video management server 200 and a transmission-unrequired image not needed to be transmitted to the video management server 200. In detail, even when the first image is compressed into a second image and the second image is transmitted, the transmission of an image that does not include certain information may lead to less efficient use of a wired/wireless communication network or a storage space of the video management server 200. Accordingly, the image classifier 190 may classify an image into a transmission-required image and a transmission-unrequired image according to a predetermined criterion (e.g., whether a preset person or object appears in the image, whether a sound equal to or higher than a preset decibel is produced, or a preset event occurs in the image). The image converter 120 may generate the second image by compressing only the transmission-required image.

According to an exemplary embodiment, the first image that is a high-resolution image may be cumulatively stored in the memory 180. However, since there is a limitation in a storage capacity of the memory 180, when a remaining storage capacity of the memory 180 is less than a threshold value, the imaging device 100 may perform overwriting by writing a new image on top of existing images. In this process, the image classifier 190 may select a backup image to be transmitted to the video management server 200, from among the existing images to be overwritten, that is, the existing images stored in the memory 180 and expected to be deleted.

According to an exemplary embodiment, the image classifier 190 may select an image whose high-resolution version has been provided to an external device, for example, a user device, from among the existing images expected to be deleted, as a backup image. According to an exemplary embodiment, the image classifier 190 may select a backup image by referring to low-resolution metadata corresponding to the existing images expected to be erased. For example, the image classifier 190 may select a backup image by referring to event information, a user search history, or a history of transmission to the external device included in the low-resolution metadata corresponding to the existing images expected to be deleted.

A machine learning algorithm may be used in a process of selecting a backup image, and an operation of directly selecting a backup image by a user to learn the selection process may be performed several times. The image classifier 190 may learn the machine learning algorithm by referring to data (e.g., low-resolution metadata, a user search history, or a history of transmission to the external device) corresponding to the backup image selected by the user. The image classifier 190 may select a backup image based on data corresponding to the existing images expected to be erased according to the machine learning algorithm.

The image transmitter 130 may transmit an image selected as the backup image to the video management server 200.

Figure 5:
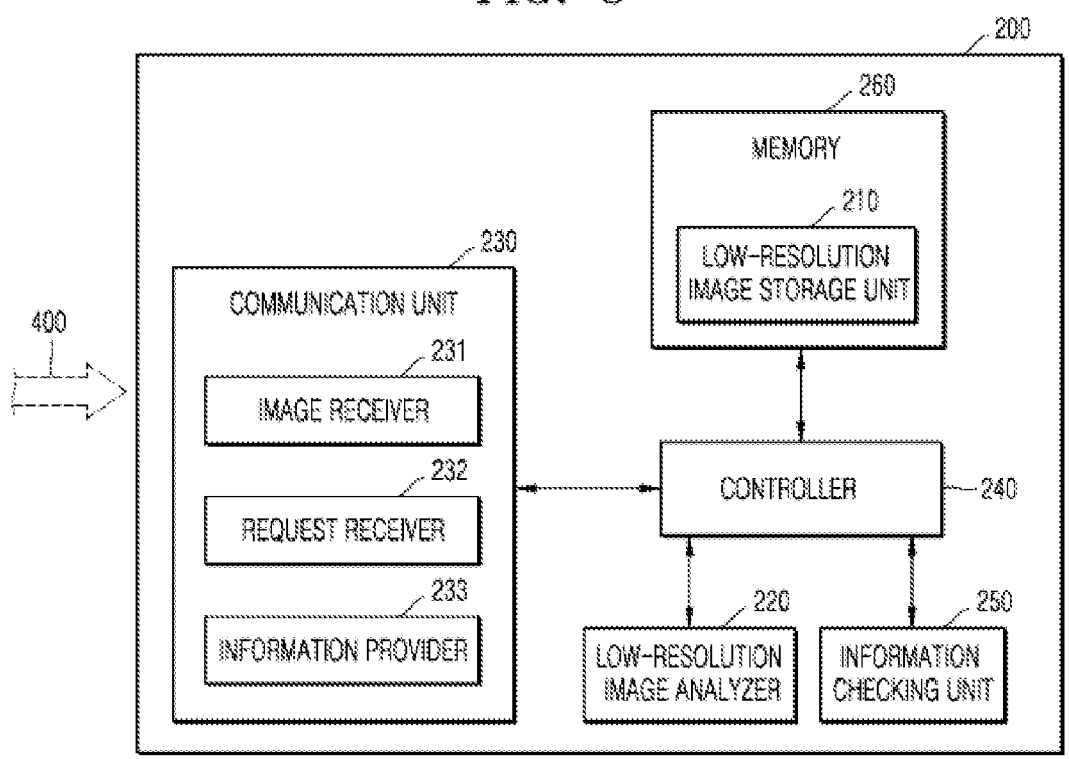
FIG. 5 is a block diagram illustrating a configuration of a video management server according to an exemplary embodiment.

FIG. 5 is a block diagram illustrating a configuration of the video management server 200 according to an exemplary embodiment.

Referring to FIG. 5, the video management server 200 may further include a communication unit 230, an image receiver 231, a request receiver 232, an information provider 233, a controller 240, an information checking unit 250, and a memory 260 in addition to the low-resolution image storage unit 210 and the low-resolution image analyzer 220.

The communication unit 230 may allow the video management server 200 to perform wired/wireless communication with other electronic devices including the imaging device 100 and/or the external device 300, and to transmit/receive an electronic signal to/from the outside by wire or wireless communication. The communication unit 230 may include the image transmitter 130. Examples of the communication unit 230 may include, but are not limited to, a Bluetooth communication unit, a BLE communication unit, an NFC unit, a WLAN communication unit (e.g., a Wi-Fi communication unit), a ZigBee communication unit, an IrDA communication unit, a WFD communication unit, a UWB communication unit, and an ANT+ communication unit.

The communication unit 230 may include the image receiver 231, the request receiver 232, and/or the information provider 233.

The image receiver 231 may receive a second image transmitted from the imaging device 100.

The request receiver 232 may receive the second image from the imaging device 100 or an information request signal requesting information related to the second image from the external device 300.

The information provider 233 may provide a whole or a part of the second image, low-resolution image metadata, and/or an index of the low-resolution image metadata to the external device 300 in response to the received information request signal.

The controller 240 may include a processor configured to control all operations of the video management server 200. The controller 240 may include any type of device capable of processing data such as a processor. The processor may include, for example, a data processing device embedded in hardware and having a circuit physically structured to execute code or commands included in a program. As such, examples of the data processing device embedded in hardware may include, but are not limited to, a microprocessor, a CPU, a processor core, a multiprocessor, an ASIC, and an FPGA.

The video management server 200 may further include the information checking unit 250 configured to determine whether information corresponding to the information request signal is included in the second image.

For example, when the video management server 200 receives an information request signal to check a point in time when, for example, a bicycle appears in the second image from the external device 300, whether a specific object appears in an image and whether the specific object is a bicycle may be determined by using the second image that is a relatively low-resolution image. In this case, the information checking unit 250 may determine whether information corresponding to the information request signal is included in the second image.

Alternatively, when the video management server 200 receives an information request signal to check, for example, a brand of a bicycle appearing in the second image from the external device 300, although whether a bicycle appears may be determined by using the second image, it may be difficult to check a brand of the bicycle by using the second image that is a relatively low-resolution image. In this case, the information checking unit 250 may not determine whether information corresponding to the information request signal is not included in the second image.

When it is determined that information corresponding to the information request signal is not included in the second image, the information checking unit 250 may determine whether the information corresponding to the information request signal is included in the first image. In this case, an information request signal to determine whether the information corresponding to the information request signal is included in the first image may be transmitted to the imaging device 100. Next, the video management server 200 may receive a response signal to the information request signal and may determine whether the information corresponding to the information request signal is included in the first image.

When it is determined that the information corresponding to the information request signal is not included in the second image and is included in the first image, the video management server 200 may transmit, to the imaging device 100, a transmission signal for providing at least one from among the entire first image, a part of the first image, and/or information obtained by analyzing the first image to the external device 300. The imaging device 100 may provide information requested by the external device 300 to the external device 300 in response to the transmission signal. The transmission signal may be transmitted to the imaging device 100 by the information checking unit 250 of the video management server 200.

Figure 6:
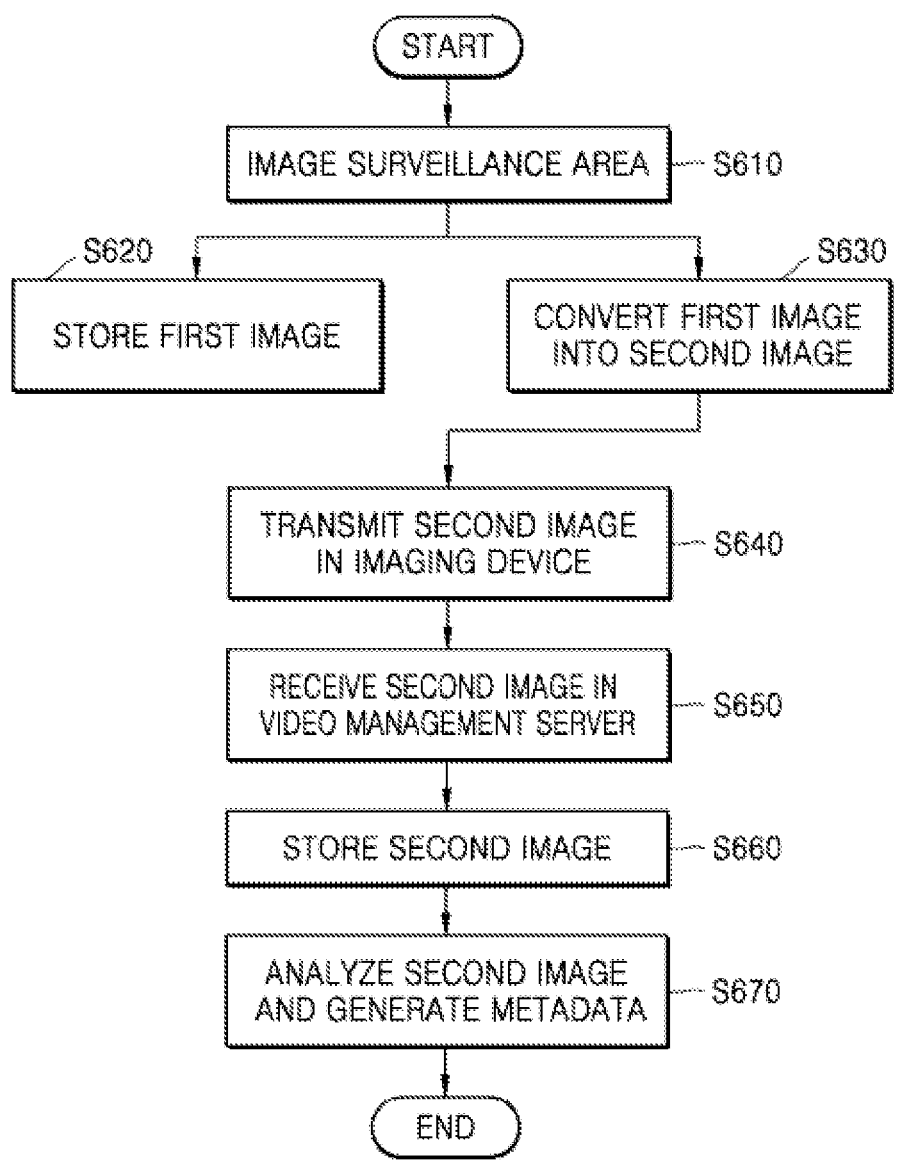
FIGS. 6 through 8 are flowcharts of a video management method according to exemplary embodiments.
Figure 7:
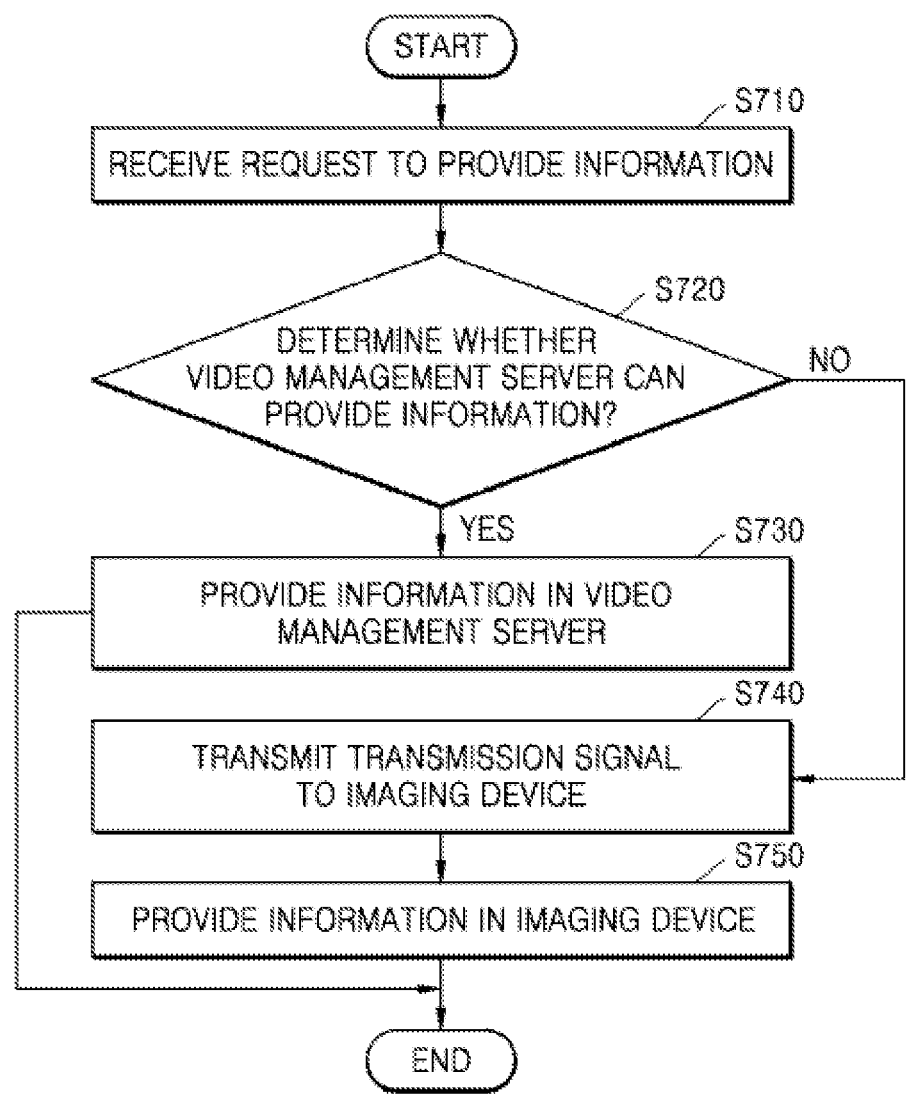
Figure 8:
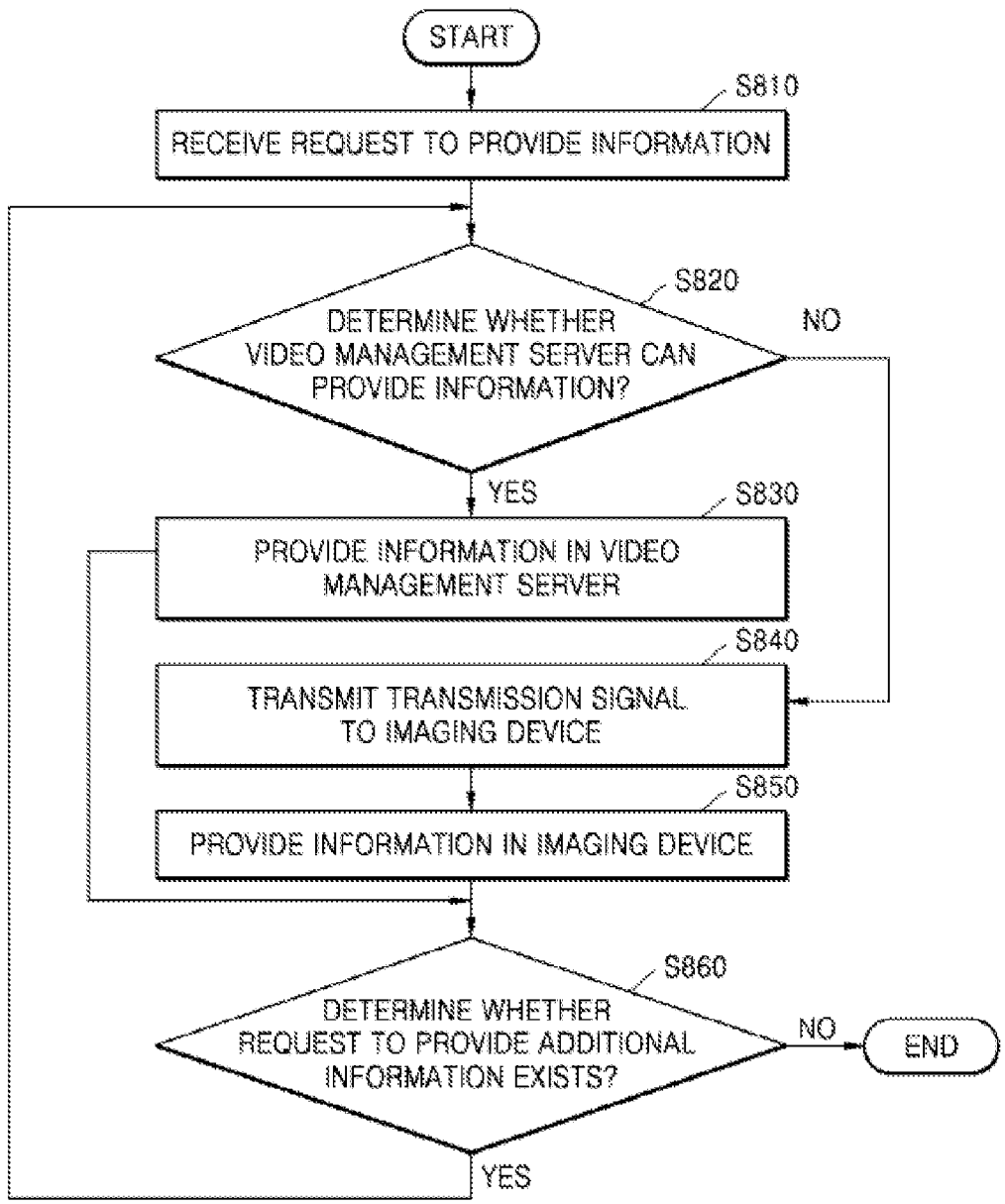

FIGS. 6 through 8 are flowcharts for explaining a video management method according to exemplary embodiments.

Referring to FIG. 6, the video management method according to an exemplary embodiment may be performed by the imaging device 100 and the video management server 200.

First, in operation S610, the imaging device 100 may capture a surveillance area. In this case, the imaging device 100 may generate a first image by capturing the surveillance area at a first resolution. Next, in operation S620, the imaging device 100 may store the first image. Operation S620 may be performed by the high-resolution image storage unit 110 of the imaging device 100. Also, in operation S630, the imaging device 100 may convert the first image into a second image. In this case, the second image may be an image having a second resolution that is lower than the first resolution. Operation S630 may be performed by the image converter 120 of the imaging device 100. Operations S620 and S630 may be performed so that operations S620 and S630 at least partially overlap each other.

Next, in operation S640, the imaging device 100 may transmit the second image to the video management server 200. Next, in operation S650, the video management server 200 may receive the second image. Next, in operation S660, the video management server 200 may store the second image. Next, in operation S670, the video management server 200 may generate low-resolution image metadata and/or an index of the low-resolution image metadata by analyzing the second image.

Referring to FIG. 7, the video management method according to an exemplary embodiment may be performed by the imaging device 100 and the video management server 200. The video management method of FIG. 7 may be performed after the first image and the second image are generated and are respectively stored in the imaging device 100 and the video management server 200 by the video management method of FIG. 6.

First, in operation S710, the video management server 200 may receive an information request signal from the external device 300.

Next, in operation S720, the video management server 200 may determine whether information corresponding to the information request signal may be provided to the external device 300 by using only the second image, low-resolution image metadata, and/or an index of the low-resolution image metadata stored in the video management server 200.

When it is determined in operation S720 that the information corresponding to the information request signal may be provided to the external device 300 by using only information stored in the video management server 200, the video management method may proceed to operation S730. In operation S730, the video management server 200 may provide the information to the external device 300.

When it is determined in operation S720 that the information corresponding to the information request signal may not be provided to the external device 300 by using only the information stored in the video management server 200, the video management method may proceed to operation S740. In operation S740, the video management server 200 may transmit a transmission signal including content of the information request signal to the imaging device 100. In this case, in operation S750, the imaging device 100 may check the transmission signal and may transmit the information corresponding to the information request signal to the external device 300.

Referring to FIG. 8, an operation of providing information to the external device 300 through the imaging device 100 and/or the video management server 200 may be repeatedly performed. That is, like in the method of FIG. 7, in operation S810, the video management server 200 may receive an information request signal, in operation S820, it may be determined whether information may be provided only through the video management server 200, in operation S830, when it is determined that the information may be provided, the video management server 200 may provide the information, in operation S840, when it is determined that the information may not be provided only through the video management server 200, a transmission signal may be transmitted to the imaging device 100, and in operation S850, the imaging device may provide the information. After the information is completely provided in operation S830 or S850, in operation S860, it may be determined whether the video management system 10 receives a request to provide additional information. That is, while checking an image, a user of the external device 300 may transmit a request to the video management server 200 to provide information related to the image several times. In this case, when an additional information request is received, the video management system 10 may return to operation S820 and may determine whether information may be provided only through the video management server 200 or information of the first image stored in the imaging device 100 is required. Operation S860 may be performed by the video management server 200.

When the video management system 10 is used, since the imaging device 100 does not need to analyze detailed content of an image, the imaging device 100 may not need to perform relatively complex intelligent image analysis and costs of the imaging device 100 may not be increased. Also, since only the second image that is a relatively low-resolution image is uploaded from the imaging device 100 to the video management server 200, the burden on the video management server 200 that receives an image may be reduced. Also, since the user of the external device 300 may obtain information that may be obtained by using only the second image that is a low-resolution image through the video management server 200 and when the first image is required, may receive the first image from the imaging device 100, an effect similar to that obtained when the imaging device 100 or the video management server 200 directly analyzes a high-resolution image may be achieved.

According to the exemplary embodiments, there may be provided a video management system and a video management method that may allow an imaging device to capture a high-resolution image, and simultaneously store the high-resolution image and transmit a low-resolution image converted from the high-resolution image to a video management server.

Figure 9:
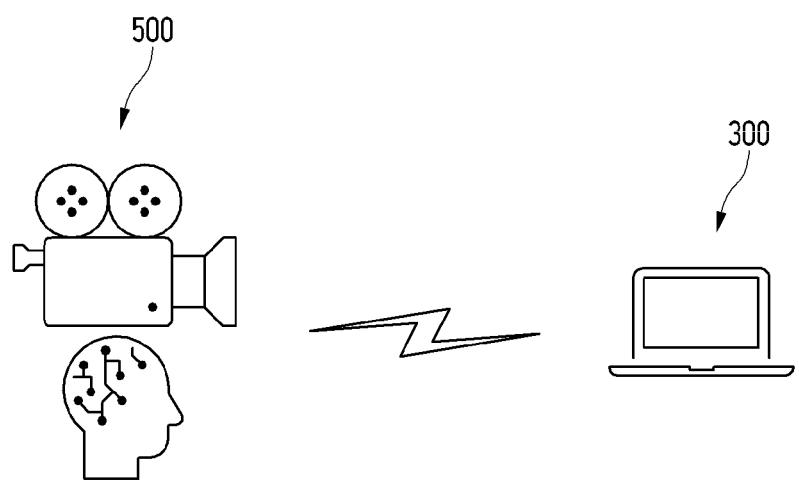
FIG. 9 is a diagram illustrating one example of another configuration of a vide management system according to an exemplary embodiment.

FIG. 9 is a diagram illustrating one example of another configuration of a vide management system according to an exemplary embodiment.

Referring to FIG. 9, the image management system 10 may include a video apparatus 500 and an external apparatus 300.

The video apparatus 500 as a form in which the imaging device 100 and the video management server 200 illustrated in FIG. 1 are combined may perform all of the functions of the imaging device and the video management server mentioned in FIG. 1.

That is, the video apparatus may have a function of recording a surveillance area or capturing a photograph, and a function of recording a sound generated from the surveillance area, and a function of generating, when a change such as a motion or the sound occurs in the surveillance area, a notification for the change or performing recording or photograph capturing.

Further, the video apparatus may store a captured video (or image) itself and/or a video acquired by editing the corresponding video, and generate a metadata and index information for the corresponding metadata by analyzing the stored video, and generate the metadata and the index information for the corresponding metadata by analyzing video information and/or acoustic information included in the video jointly or separately.

As an example, the video apparatus may parse the captured video into a plurality of sub videos (or sub images), and convert the plurality of parsed sub videos into the other video or not convert but store the sub videos. The video converted into the other video and stored may correspond to a video having a smaller bandwidth or having a lower resolution (transmission) than the captured video, and the video not converted into the other video but stored may be a video corresponding to a best shot of the captured video.

The external device 300 of FIG. 9 means a device which is the same as the external device described in FIG. 1, and a detailed description of the external device of FIG. 9 is made with reference to FIG. 1 and the above-mentioned contents.

Figure 10:
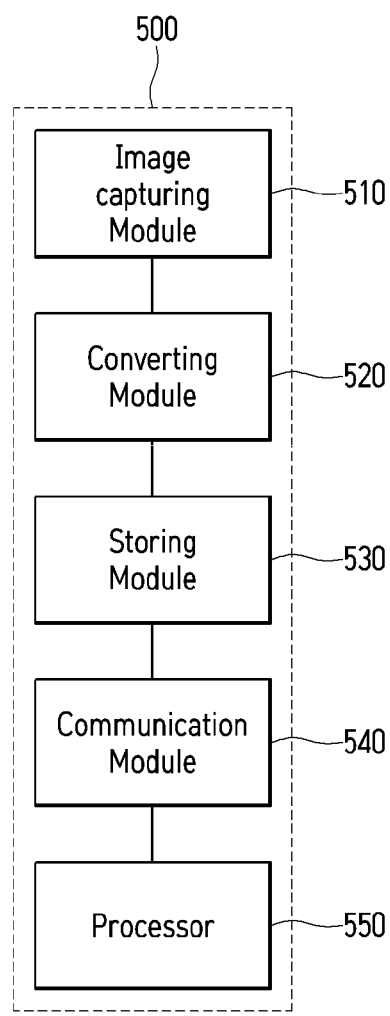
FIG. 10 is a diagram illustrating one example of an internal block diagram of a video apparatus according to an exemplary embodiment.

FIG. 10 is a diagram illustrating one example of an internal block diagram of a video apparatus according to an exemplary embodiment.

Referring to FIG. 10, the video apparatus 500 may include an image capture module 510, a converting module 520, a storing module 530, a communication module 540, and a processor 550.

The image capturing module 510 generates a video (or an image) by capturing a surveillance area. Here, the video includes both a still image and a moving picture unless particularly mentioned, and the video described in FIG. 10 and the video mentioned in the present disclosure may include both the still image and the moving picture unless particularly mentioned.

The converting module 520 converts a first image into a second image. The second image may have a second resolution lower than a first resolution of the first image. The first resolution may be a high resolution, and the second resolution may be a low resolution. In this case, the first image may be a high-resolution image and the second image may mean a low-resolution image.

Alternatively, the first image may be an image having a large bandwidth or an image requiring large data processing, and the second image may be an image having a small bandwidth or an image requiring small data processing.

Alternatively, the first image may be a detailed image of the second image.

Here, a specific image among the images captured by the image capturing module may not be converted by the converting module, and one example of the specific image may be the image corresponding to the best shot.

The storage module 530 stores the first image and the second image.

The communication module 540 transmits and receives a wireless signal to and from the outside.

The processor 550 may be configured to be functionally connected with the image capturing module, the converting module, the storing module, and the communication module.

More specifically, the processor may receive a request signal for requesting information related to the second image from an external device, generate a metadata related to the second image by analyzing the second image, and transmit, to the external device, additional information about the second image based on the metadata.

Further, the processor may transmit at least a portion of a metadata related to the first image to the outside, and at least a portion of the metadata related to the first image may be transmitted when the communication module receives, from the external device, a request signal for requesting information related to the first image.

Further, the processor may generate the metadata related to the first image by analyzing the first image, and store a metadata related to the generated first image.

Here, the second image may be analyzed based on a machine learning technique.

Figure 11:
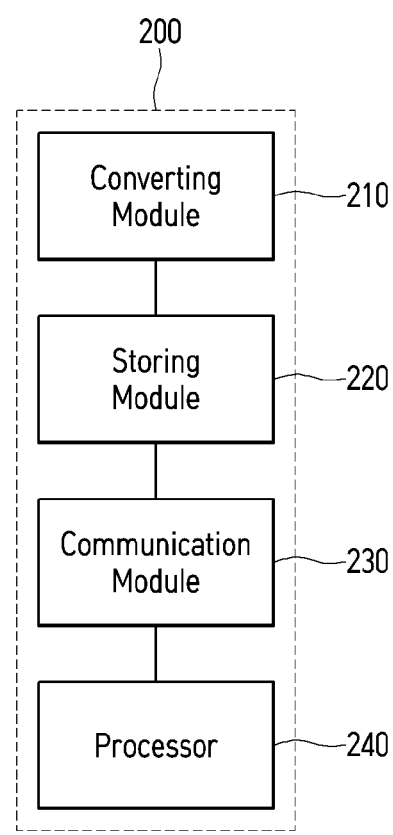
FIG. 11 illustrates one example of an internal block diagram of a server of a video management system according to an exemplary embodiment.

FIG. 11 illustrates one example of an internal block diagram of a server of a video management system according to an exemplary embodiment.

A difference between the server of the video management system illustrated in FIG. 11 and the video storing server illustrated in FIG. 5 is that the server illustrated in FIG. 11 additionally performs a function of converting an image.

The server illustrated in FIG. 11 may be expressed as a server device, a cloud device, a could edge device, an edge device, a gateway device, a bride device, etc., and may include a converting module 210, a storing module 220, a communication module 230, and a processor 240.

The converting module 210 converts a first image into a second image. The second image may have a second resolution lower than a first resolution of the first image. The first resolution may be a high resolution, and the second resolution may be a low resolution. In this case, the first image may be a high-resolution image and the second image may mean a low-resolution image.

Alternatively, the first image may be an image having a large bandwidth or an image requiring large data processing, and the second image may be an image having a small bandwidth or an image requiring small data processing.

Alternatively, the first image may be a detailed image of the second image.

A specific image among the images received from an image capturing device may not be converted by the converting module, and one example of the specific image may be the image corresponding to the best shot.

The storage module 220 stores the first image and the second image.

The communication module 230 transmits and receives a wireless signal to and from the outside.

The processor 240 may be configured to be functionally connected with the converting module, the storing module, and the communication module.

More specifically, the processor may receive a request signal for requesting information related to the second image from an external device, generate a metadata related to the second image by analyzing the second image, and transmit, to the external device, an additional information about the second image based on the metadata.

Further, the processor may transmit at least a portion of a metadata related to the first image to the outside, and at least a portion of the metadata related to the first image may be transmitted when the communication module receives, from the external device, a request signal for requesting information related to the first image.

Further, the processor may generate the metadata related to the first image by analyzing the first image, and store a metadata related to the generated first image.

Here, the second image may be analyzed based on a machine learning technique.

Figure 12:
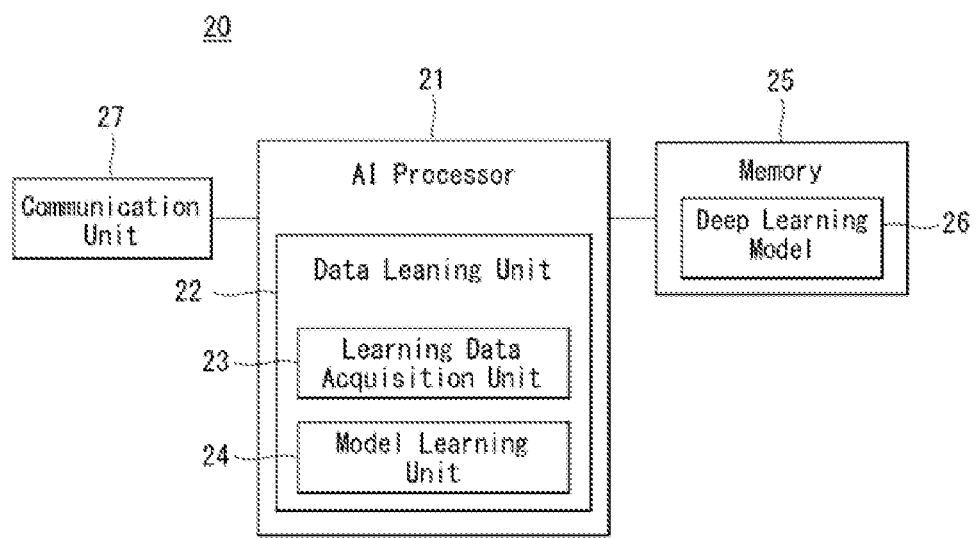
FIG. 12 is a diagram illustrating one example of an internal block diagram of an AI device according to an exemplary embodiment.

FIG. 12 is a diagram illustrating one example of an internal block diagram of an AI device according to an exemplary embodiment.

The AI device 20 may include an electronic device including an AI module capable of performing AI processing or a server including the AI module. Further, the AI device 20 may also be provided to be included in at least a partial component of the electronic device or the server to perform at least a portion of the AI processing jointly.

As one example, the AI device 20 may be included in the imaging device 100, the image management server 200, or the external device 300 of FIG. 1, and included in the video apparatus 500 of FIG. 9.

The AI device 20 may include an AI processor 21, a memory 25, and/or a communication unit 27.

The AI device 20 as a computing device capable of learning a neural network may be implemented as various electronic devices including a server, a desktop PC, a notebook PC, a tablet PC, etc.

The AI processor 21 may learn the neural network by using a program stored in the memory 25. In particular, the AI processor 21 may learn a neural network for recognizing video related data. Here, the neural network for recognizing the video related data may be designed to simulate a brain structure of the human on a computer, and may include a plurality of network nodes having a weight, which simulates a neuron of the neural network of the human. Each of the plurality of network nodes may send and receive data according to a connection relationship so as to simulate a synaptic activity of the neuron in which the neuron sends and receives a signal through a synapse. Here, the neural network may include a deep learning model developed from a neural network model. In the deep learning model, the plurality of network nodes may send and receive according to a convolution connection relationship while being positioned on different layers. Examples of the neural network model may include various deep learning techniques such as deep neural networks (DNN), convolutional deep neural networks (CNN), a Recurrent Boltzmann Machine (RNN), a Restricted Boltzmann Machine (RBM), deep belief networks (DBN), and a Deep Q-Network.

Meanwhile, the processor performing the above-described function may be a universal processor (e.g., CPU), but may be an AI dedicated processor (e.g., GPU) for AI learning.

The memory 25 may store various programs and data required for the operation of the AI device 20. The memory 25 may be implemented as a non-volatile memory, a volatile memory, a flash memory, a hard disk driver (HDD), or a solid state drive (SDD). The memory 25 may be accessed by an AI processor 21 and read/write/modify/delete/update, etc., of the data by the AI processor 21 may be performed. Further, the memory 25 may store a neural network model (e.g., a deep learning model 26) generated through a learning algorithm for data classification/recognition according to an exemplary embodiment of the present disclosure.

Meanwhile, the AI processor 21 may include a data learning unit 22 learning the neural network for the data classification/recognition. The data learning unit 22 may learn a criterion related to which learning data is to be used in order to determine the data classification/recognition and how the data is to be classified and recognized by using learning data. The data learning unit 22 may learn the deep learning model by acquiring the learning data to be used for learning and applying the acquired learning data to the deep learning model.

The data learning unit 22 may be manufactured in at least one hardware chip form and mounted on the AI device 20. For example, the data learning unit 22 may be manufactured in a dedicated hardware chip form for artificial intelligence (AI), and may also be manufactured as a portion of the universal processor (CPU) or a graphic dedicated processor (GPU) and mounted on the AI device 20. Further, the data learning unit 22 may be implemented as a software module. When the data learning unit 22 is implemented as a program including a software module (or an instruction), the software module may be stored in non-transitory computer readable media. In this case, at least one software module may be provided by an operating system (OS) or provided by an application.

The data learning unit 22 may include a learning data acquiring unit 23 and a model learning unit 24.

The learning data acquiring unit 23 may acquire the learning data required for the neural network model for classifying and recognizing the data. For example, the learning data acquiring unit 23 may acquire data to be input into the neural network model and/or sample data, as the learning data.

The model learning unit 24 may learn the neural network model to have a determination criterion regarding how to classify predetermined data by using the acquired learning data. In this case, the model learning unit 24 may learn the neural network model through supervised learning using at least a portion of the learning data as the determination criterion. Alternatively, the model learning unit 24 may learn the neural network model through unsupervised learning discovering the determination criterion by autonomously learning by using the learning data without supervising. Further, the model learning unit 24 may learn the neural network model through reinforcement learning by using a feedback regarding whether a result of situation determination according to learning being correct. Further, the model learning unit 24 may learn the neural network model by using a learning algorithm including error back-propagation or gradient decent.

When the neural network model is learned, the model learning unit 24 may store the learned neural network model in the memory. The model learning unit 24 may also store the learned neural network model in a memory of a server connected with the AI device 20 through a wired or wireless network.

The data learning unit 22 may further include a learning data preprocessing unit (not illustrated) and a learning data selecting unit (not illustrated) in order to enhance an analysis result of a recognition model or save a resource or a time required for generating the recognition model.

The learning data preprocessing unit may preprocess the acquired data so that the acquired data may be used for the learning for the situation determination. For example, the learning data preprocessing unit may process the acquired data in a predetermined format so as for the model learning unit 24 may use learning data acquired for learning for video recognition.

Further, the learning data selecting unit may select data required for the learning of the learning data acquired by the learning data acquiring unit 23 or the learning data preprocessed by the preprocessing unit. The selected learning data may be provided to the model learning unit 24. For example, the learning data selecting unit detects a specific area in the acquired video to select only data regarding an object included in the specific area as the learning data.

Further, the data learning unit 22 may further include a model evaluation unit (not illustrated) in order to enhance the analysis result of the neural network model.

The model evaluation unit may input evaluation data into the neural network model and when the analysis result output from the evaluation data does not satisfy a predetermined criterion, the model evaluation unit may allow the model learning unit 22 to learn the model again. In this case, the evaluation data may be predefined data for evaluating the recognition model. As an example, when the number or a ratio of evaluation data in which the analysis result is not accurate in the analysis result of the learned recognition model for the evaluation data exceeds a predetermined threshold, the model evaluation unit may evaluate that the predetermined criterion is not satisfied.

The communication unit 27 may transmit an AI processing result by the AI processor 21 to an external electronic device.

Meanwhile, it is described that the AI device 20 illustrated in FIG. 12 is functionally divided into the AI processor 21, the memory 25, and the communication unit 27, but it is revealed that the above-described components may also be integrated into one module and called an AI module.

Also, according to the exemplary embodiments, there may be provided a video management system and a video management method that may allow a video management server to analyze a low-resolution image, provide the low-resolution image and an analysis result according to a request of an external device, and when receiving a request to provide information related to a high-resolution image from the external device, provide the information through an imaging device.

While the present disclosure has been shown and described with reference to exemplary embodiments thereof, they are provided for the purposes of illustration. It will be understood by one of ordinary skill in the art that various modifications and equivalent embodiments may be made without departing from the principles and technical spirit of the present disclosure as defined by the appended claims, and their equivalents.

What is claimed is:

1. A server system comprising:
   a converter configured to convert a first image with a first resolution to a second image with a second resolution;
   a storing module configured to store at least one of the first image and the second image;
   a communication module configured to transceive a wireless signal; and
   a processor configured to functionally be connected with the converting module, the storing module and the communication module, the processor being configured to:
   receive, from an imaging device, the first image captured by the imaging device;
   receive, from an external device, a request signal for requesting information related to the second image;
   generate a metadata related to the second image by analyzing the second image; and
   transmit, to the external device, an additional information about the second image based on the metadata.

2. The server device of claim 1, wherein the processor is further configured to transmit, to the external device, at least a portion of a metadata related to the first image.

3. The server device of claim 2, wherein the at least a portion of the metadata related to the first image is transmitted when the communication module receives, from the external device, a request signal for requesting information related to the first image.

4. The server device of claim 3, wherein the processor is further configured to generate the metadata related to the first image by analyzing the first image.

5. The server device of claim 4, wherein the processor is further configured to store the metadata related to the first image.

6. The server device of claim 1, wherein generating the metadata related to the second image includes a machine learning technique.

7. The server device of claim 1, wherein the second resolution has a lower resolution than the first resolution.

8. The server device of claim 1, wherein the second image has a smaller bandwidth than the first image.

9. The server device of claim 6, wherein the converter does not convert a specific image of the first image captured by the image capturing module.

10. The server device of claim 9, wherein a specific image is a best shot image.

11. A video apparatus comprising:
    an image capturing module configured to capture a first image;
    a converter configured to convert the first image with a first resolution to a second image with a second resolution;
    a storing module configured to store the first image and the second image;
    a communication module configured to receive a wireless signal; and
    a processor configured to functionally be connected with the image capturing module, the converting module, the storing module and the communication module, the processor being configured to:
    receive, from an external device, a request signal for requesting metadata information related to the second image;
    generate metadata related to the second image by analyzing the second image; and
    transmit, to the external device, the requested metadata information about the second image based on the metadata.

12. The video apparatus of claim 11, wherein the processor is further configured to transmit, to the external device, at least a portion of a metadata related to the first image.

13. The video apparatus of claim 12, wherein the at least a portion of the metadata related to the first image is transmitted when the communication module receives, from the external device, a request signal for requesting information related to the first image.

14. The video apparatus of claim 13, wherein the processor is further configured to generate the metadata related to the first image by analyzing the first image.

15. The video apparatus of claim 14, wherein the processor is further configured to store the metadata related to the first image.

16. The video apparatus of claim 11, wherein generating the metadata related to the second image includes a machine learning technique.

17. The video apparatus of claim 16, wherein the converter does not convert a specific image of the first image captured by the image capturing module.

18. The video apparatus of claim 17, wherein a specific image is a best shot image.

19. The video apparatus of claim 11, wherein the second resolution has a lower resolution than the first resolution.

\* \* \* \* \*